US010110997B2

(12) United States Patent
Every

(10) Patent No.: US 10,110,997 B2
(45) Date of Patent: Oct. 23, 2018

(54) SYSTEM AND METHOD FOR FEEDBACK CONTROL FOR IN-CAR COMMUNICATIONS

(71) Applicant: 2236008 Ontario Inc., Waterloo (CA)

(72) Inventor: Mark Robert Every, Burnaby (CA)

(73) Assignee: 2236008 Ontario, Inc., Waterloo (CA)

( * ) Notice: Subject to any disclaimer, the term of this patent is extended or adjusted under 35 U.S.C. 154(b) by 0 days.

(21) Appl. No.: 15/436,311

(22) Filed: Feb. 17, 2017

(65) Prior Publication Data
US 2018/0242081 A1 Aug. 23, 2018

(51) Int. Cl.
*H04B 1/00* (2006.01)
*H04R 3/02* (2006.01)
*H04R 3/04* (2006.01)
*H04R 3/00* (2006.01)

(52) U.S. Cl.
CPC .............. *H04R 3/02* (2013.01); *H04R 3/005* (2013.01); *H04R 3/04* (2013.01); *H04R 2430/01* (2013.01); *H04R 2499/13* (2013.01)

(58) Field of Classification Search
CPC ... H04R 2499/13; H04R 3/02; H04M 1/6083; H04S 7/301; G10L 2021/02082; H03G 3/32; H03G 5/165; H03G 7/002
See application file for complete search history.

(56) References Cited

U.S. PATENT DOCUMENTS

2005/0265560 A1* 12/2005 Haulick ................ H03G 5/165
381/58

FOREIGN PATENT DOCUMENTS

| EP | 1080606 | 3/2001 |
|----|---------|--------|
| EP | 1591995 | 11/2005 |
| EP | 2203000 | 6/2010 |
| EP | 2439958 | 4/2012 |
| WO | WO 2009138754 | 11/2009 |

OTHER PUBLICATIONS

Schmidt, G. and Haulick, T., Signal Processing for In-Car Communication System, May 6, 2005, 1-22, Harman/Becker Automotive Systems, Temic SDS, Research Dept. Division Acoustics, Soflinger Str. 100, Ulm, Germany.*
Extended European Search Report; EP 18156893.2; dated Jul. 4, 2018.

* cited by examiner

*Primary Examiner* — Duc Nguyen
*Assistant Examiner* — Kile Blair
(74) *Attorney, Agent, or Firm* — Ridout and Maybee LLP

(57) ABSTRACT

A system and method (referred to as the system) that mitigates feedback in an audio system that adjust voice signals in a vehicle. The system generates transfer function estimates from multiple loudspeakers to multiple microphones and generates maximum forward path frequency-dependent gains based on the transfer function estimates and a frequency-dependent tuning factor for each of the loudspeakers to each of the microphones. The system generates forward path frequency-dependent gains independently that are applied to multiple loudspeaker signals, each of the loudspeaker signals drive one of the loudspeakers, respectively. The forward path frequency-dependent gains are adjusted based on the maximum forward path frequency-dependent gains.

24 Claims, 8 Drawing Sheets

SYSTEM AND METHOD FOR FEEDBACK CONTROL FOR IN-CAR COMMUNICATIONS

BACKGROUND OF THE DISCLOSURE

1. Technical Field

This disclosure relates to processing audio signals and in particular, to a system and method that reinforces speech and mitigates feedback.

2. Related Art

Noise within a vehicle makes it difficult for drivers and passengers to communicate. The noise may come from traffic, the road, from the vehicle itself or other sources. To improve in-vehicle communication, some systems increase voice signal levels to overcome the noisy environments. The feedback created by these systems can be re-processed, feeding the signal back upon itself, and if left uncontrolled, result in a ringing or a howling that can cause discomfort to the driver and the passengers. The disclosed in-car communication systems mediate this problem and dynamically improve in vehicle acoustics.

BRIEF DESCRIPTION OF THE DRAWINGS

This disclosure refers to the following drawings and descriptions. The components in the figures are not necessarily to scale, but illustrate the principles of the disclosure. Moreover, in the figures, like referenced numerals designate corresponding parts throughout the different views.

DETAILED DESCRIPTION

In-car communications systems and methods (herein referred to as the system(s) or the ICC system(s)) improve voice communication between occupants by reinforcing desired signals. One or more microphone signals are processed and played out of in-vehicle loudspeakers to reinforce these desired signals. This feature allows a driver, a co-driver, and other passengers to communicate with each other without raising their voices or creating distractions even in noisy conditions. Some systems leverage existing hardwired and wireless communication systems within the vehicle that may include in-cabin microphones and infotainment loudspeakers making the system a unitary part of the vehicle in some applications, and in others, an independent system that is ancillary to or separate from a vehicle. Each of these systems adds features that improve seat-to-seat or zone-to-zone communication through feedback mitigation. Some systems include one or more optional noise reduction modules, static and/or dynamic echo reduction modules configured to or tuned to cancel entertainment or infotainment audio and other in vehicle sounds that are not passenger or driver voices in an audio range. These in vehicle sounds that the systems cancel may provide casual reminders to a driver or an occupant such as a chime that reminds the occupants to put on their seat belts or a tick-tock tone that reminds the driver that a turn signal is flashing. Some vehicle sounds not reinforced by the system are even more jarring. These vehicle sounds may alert a driver or occupants to an unsafe operating condition such as a vehicle that is approaching from a blind spot, the likelihood of a collision due to oncoming traffic, or a cross traffic alert. All of these sounds and others that are not passenger or driver voices may vary by balance, frequency, volume, cadence and/or tone making these sounds uniquely identifiable. These sounds have unique characteristics that allow the system hardware and/or software to authenticate them as signature sounds, and thereafter cancel them, to ensure that signature sounds are not reinforced.

Figure 1:
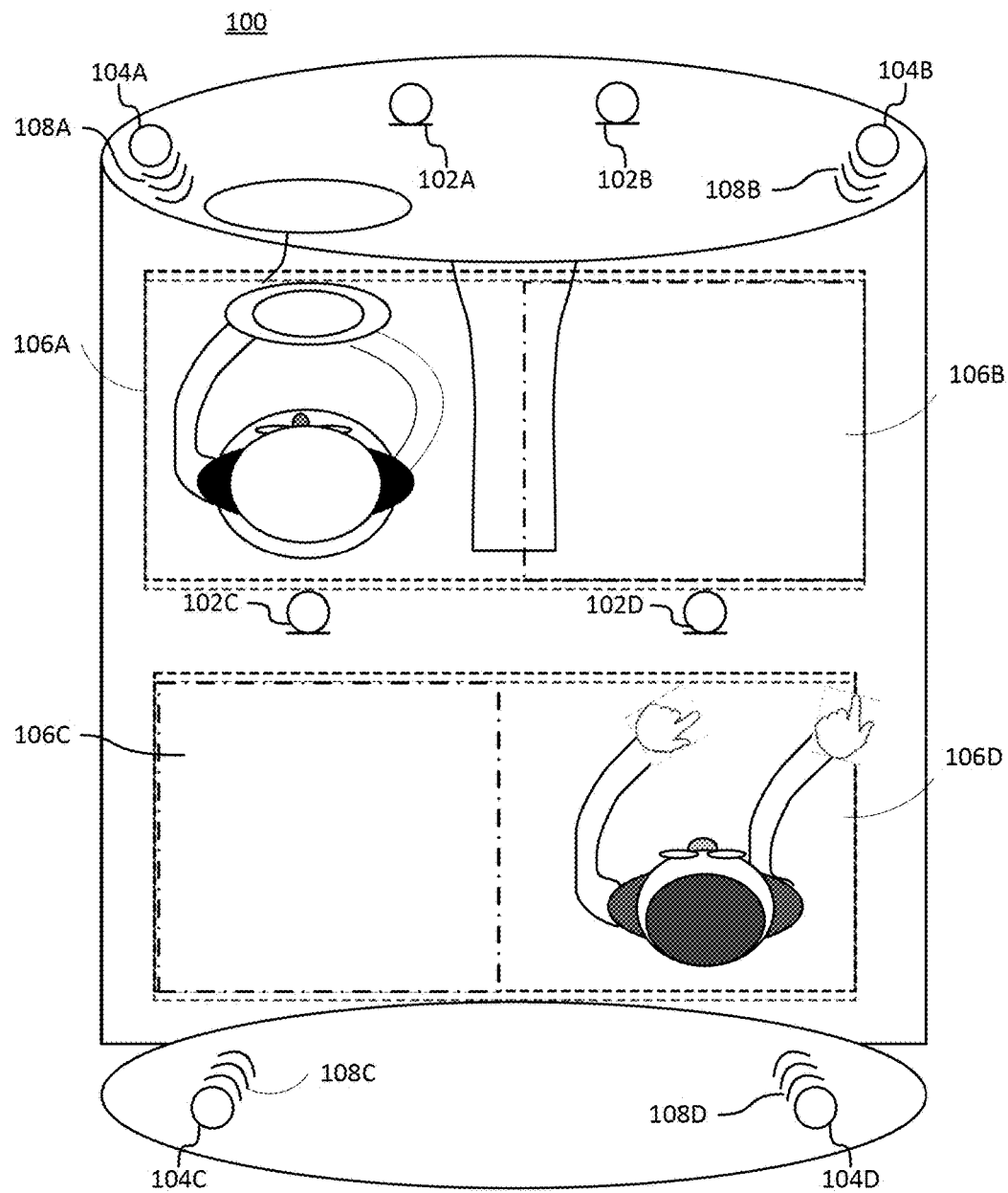
FIG. 1 is an overhead schematic view of a vehicle that includes a speech reinforcement in-car communication system.

In FIG. 1, the system improves voice communication between occupants operating in a front-to-back and a back-to-front reinforcement that is extendable to a zone-to-zone, multi-zone, or seat-to-seat reinforcement. The zones may comprise a front-left (or a driver zone or zone one 106 A), a front-right (a co-driver zone or zone two 106 B), a rear left (a passenger zone behind the driver or zone three 106 C), and a rear-right (a passenger zone behind the co-driver or zone four 106 D). Additional areas or regions distinguished from adjacent areas or regions (e.g., the zones) may also be served by the system. In a two zone operating state, the driver's microphone signals are captured by microphones 102 A and B in a front zone 106 A and B and are processed and played in a rear zone 106 C and D of the vehicle 100 through loudspeakers 104 C and D. These loudspeakers 104 C and D render front-to-back re-enforcing signals 108 C and D of the driver's voice. Likewise, one or more rear microphone signals captured by microphones 102 C and D are processed and converted into reinforced rear signals in the front zone 106 A and B through loudspeakers 104 A and B. These loudspeakers 104 A and B provide back-to-front re-enforcing signals 108 A and B to the rear passenger's voice.

Some systems include optional sound enhancements in addition to the feedback mitigation signal processing described, including one or more: noise reduction, equalization, adaptive gain, dynamics compression or limiting, secondary feedback control and/or echo reduction. A noise reduction removes noise from a microphone signal before rendering the signal through loudspeakers. In a vehicle the noise that is caused by a defroster or blower blowing on a microphone, for example, may be removed by a signal processor before the microphone signal is rendered by a loudspeaker through a noise reduction signal processing operation. A conditioning equalization may process the microphone signal to restore or modify speech timbre or spectral color by an equalization signal processing operation. An adaptive gain adapts the gain (e.g., via an amplification or an attenuation) applied to the microphone signal based on the noise sensed or estimated in the vehicle's cabin or environment. An adaptive gain system measures the noise sensed or estimated in the vehicle cabin or in the car environment through one or more in-vehicle sensors and adjusts the gain applied to the microphone to ensure that the reinforcement signals remain audible to the vehicle occupants across different noise conditions. For example, the adaptive gain may attempt to provide a constant signal-to-noise ratio, e.g., the power ratio of the desired speech to the background noise level measured at the listener's ears is constant. A dynamic compression or limiting reduces the volume or amplitude of loud sounds picked up by the microphone and/or amplifies quiet sounds by narrowing or compressing the audio signal's dynamic range through a signal processor executing a dynamic range compression signal processing operation. A secondary automated feedback control attenuates residual positive feedback that may occur when a sound loop occurs between one or more microphones (the audio input) and the audio output (one more loudspeakers or transducers) through a signal processor executing a feedback control processing operation.

In FIG. 1, the system operates when in vehicle sounds, music and/or other infotainment is playing in the vehicle 100 through loudspeakers 104 A through D too. Microphones 102 A through D receive the echo generated by the in vehicle sounds, music and/or other infotainment that are suppressed or blocked by optional echo reduction modules when the echo reduction modules are part of the system. Echo reduction modules may include linear echo cancelation and/or non-linear residual echo suppression.

In FIG. 1 a closed loop may exist between microphones 102 A through D and loudspeakers 104 A through D that are rendering the reinforcement signals 108 A through D into the vehicle cabin. When that occurs, a feedback control is necessary to avoid an unstable state and/or howling state. In the front-to-back operating state, for example, feedback may occur when reinforcement signals 108 C and/or D containing the driver or co-driver's voice played out of the one or more rear loudspeakers 104 C and/or D is picked up by one or more of the front zone microphones 102 A and/or B. In a subsequent time-frame, this feedback component in microphones 102 A and/or B will again be processed through the ICC system, and if unrestrained, will again form part of the reinforcement signals 108 C and/or D rendered through loudspeakers 104 C and/or D via a closed loop. In this unstable state, the signal feeds back upon itself, and if left uncontrolled, results in a ringing or a howling that can occur at high amplitude levels causing physical discomfort to the listener, and making the signal unusable or unsafe for the listener's hearing in some situations.

In FIG. 1, feedback control and mitigation occurs through an equalization or select frequency attenuation and/or continuous gain reduction of each of the reinforcement signals rather than through subtractions of adaptive estimates or measurements of feedback components from microphone signals. The system does not require a feedback canceller to mitigate feedback generated by reinforcement signals because the feedback is minimized by controlling the gain associated with each microphone loudspeaker pair using prior information. Feedback is mitigated by signal conditioning of the reinforcement signals that effectively reduces the closed-loop gain of the system in a frequency-dependent manner to the extent that feedback in the system is unperceivable and the system cannot enter into an unstable howling state.

Figure 2:
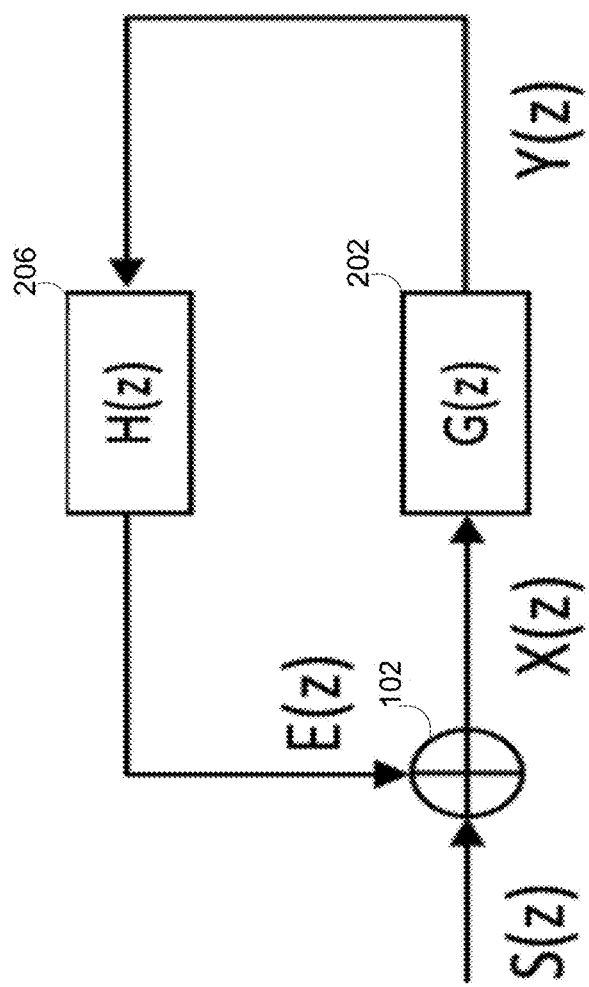
FIG. 2 is a block diagram of the speech reinforcement in-car communication system.

FIG. 2 embodies the acoustic environment of vehicle with the gain and transfer functions that interface the system. The acoustic representation includes a transfer function of an ICC system (G(z)) 202 that applies a frequency-dependent gain, and the transfer function (H(z)) 206 between a reinforcement signal and microphone signal. The representation is of system with a single microphone and single loudspeaker, but without loss of generality may apply to a system with multiple microphones and multiple loudspeakers. The transfer function H(z) 206 represents a combination of system delay/gain, a digital-to-analog conversion of the reinforcement signal, the loudspeaker response, the acoustic response from the loudspeaker to the microphone, the microphone response and the analog-to-digital conversion of the sampled signal. H(z) is therefore a function of the vehicle cabin, when the system is part of or interfaced to a vehicle. The z-transforms of the local source within the vehicle (e.g., driver speech) S(z), the signal captured by the microphone X(z), the reinforcement signal Y(z) sent to the loudspeaker, and the feedback component of the microphone E(z) are also shown. The closed loop gain of this acoustic environment is expressed by EQ. 1:

$$Y(z)/S(z) = G(z)/(1 - G(z)*H(z)) \tag{1}$$

To operate in a stable state, the zeros of the denominator, $1 - G(z)*H(z)$, lie within the unit circle in the z-plane, which occurs when (EQ. 2):

$$|G(z)*H(z)| < 1 \text{ for all } z \text{ on the unit circle,} \tag{2}$$

or equivalently:

$$|G(z)| < 1/|H(z)| \text{ for all } z \text{ on the unit circle}$$

Thus, there is an inverse relationship between the gain of the feedback path and the gain applied by the system without feedback control subject to the stability condition of EQ. 2.

Like FIG. 2, a discrete frequency domain representation of the system can be formulated using a Discrete Fourier Transform (DFT), Discrete Cosine Transform (DCT), or an alternative method rendering multiple frequency bins. Here, the magnitude at a particular frequency at bin index "k" of a feedback path within the vehicle is H[k], and G[k] is the adaptive gain applied by an ICC system at bin index "k". To maintain stability, the system adheres to a stability condition for the maximum gain applied by the ICC system established in EQ. 3:

$$G[k] < \text{beta}/H[k] \tag{3}$$

In EQ. 3, beta is an empirical tuning parameter that is less than one (beta<1). Beta is tuned to the vehicle-cabin when the ICC system reinforces signals within a vehicle or an audio enclosure when the ICCs reinforces signals within an audio enclosure. In some systems, beta is a constant; and, in other systems is it frequency dependent, meaning it adapts to the changing characteristics or conditions of the vehicle cabin or enclosure.

Figure 3:
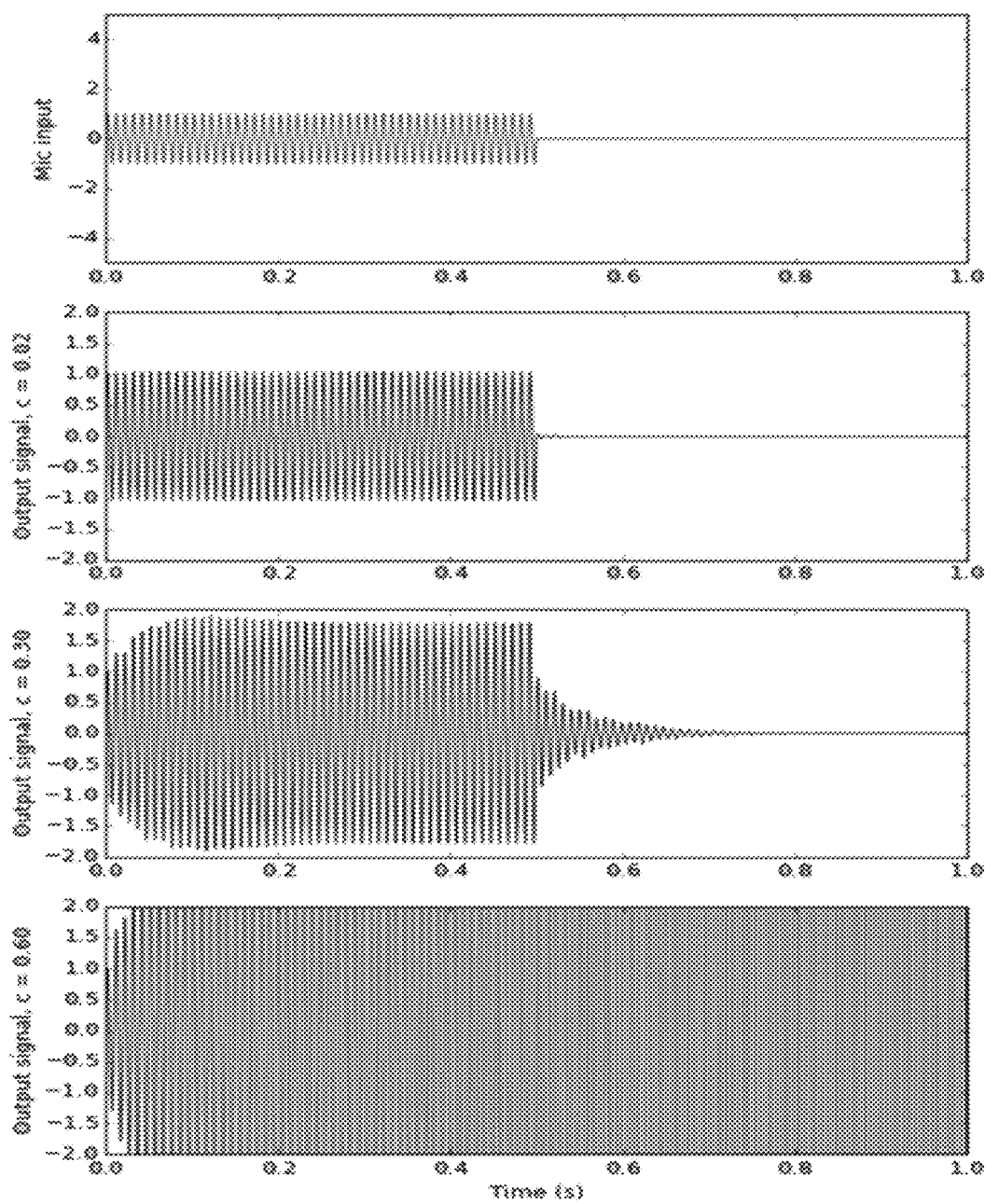
FIG. 3 is a visualization of a sound input and sound output.

FIG. 3 is a visualization of a sound input and a sound output as a function of time, where the time index will be denoted by "n". The first graph shows the microphone input (e.g., driver speech), s[n], that stops at approximately one half of a second and the graphs below show the reinforcement signal, y[n], played out of the one or more loudspeakers 104. When a controlled level of closed loop gain is applied, as shown when the output signal c=0.02, the reinforcement signal, y[n], tracks the microphone input, s[n], terminating at approximately the same time as the microphone input, s[n], with only a small usually unperceivable amount of ringing delay that stops at approximately the one half second mark. As more closed loop gain is applied, as shown when the output signal c=0.30, the reinforcement signal, y[n], continues to persist until it stops at approximately eight tenths of a second. And, finally as more closed loop gain is applied as shown when the output signal c=0.60, the reinforcement signal, y[n], becomes unstable, which causes a ringing or a howling that can cause a physical discomfort to a listener. This occurs when the gain of the estimated feedback path, H[k], and/or the frequency-dependent gain of the ICC system 202 without feedback control G[k] is not controlled and significantly large.

Figure 4:
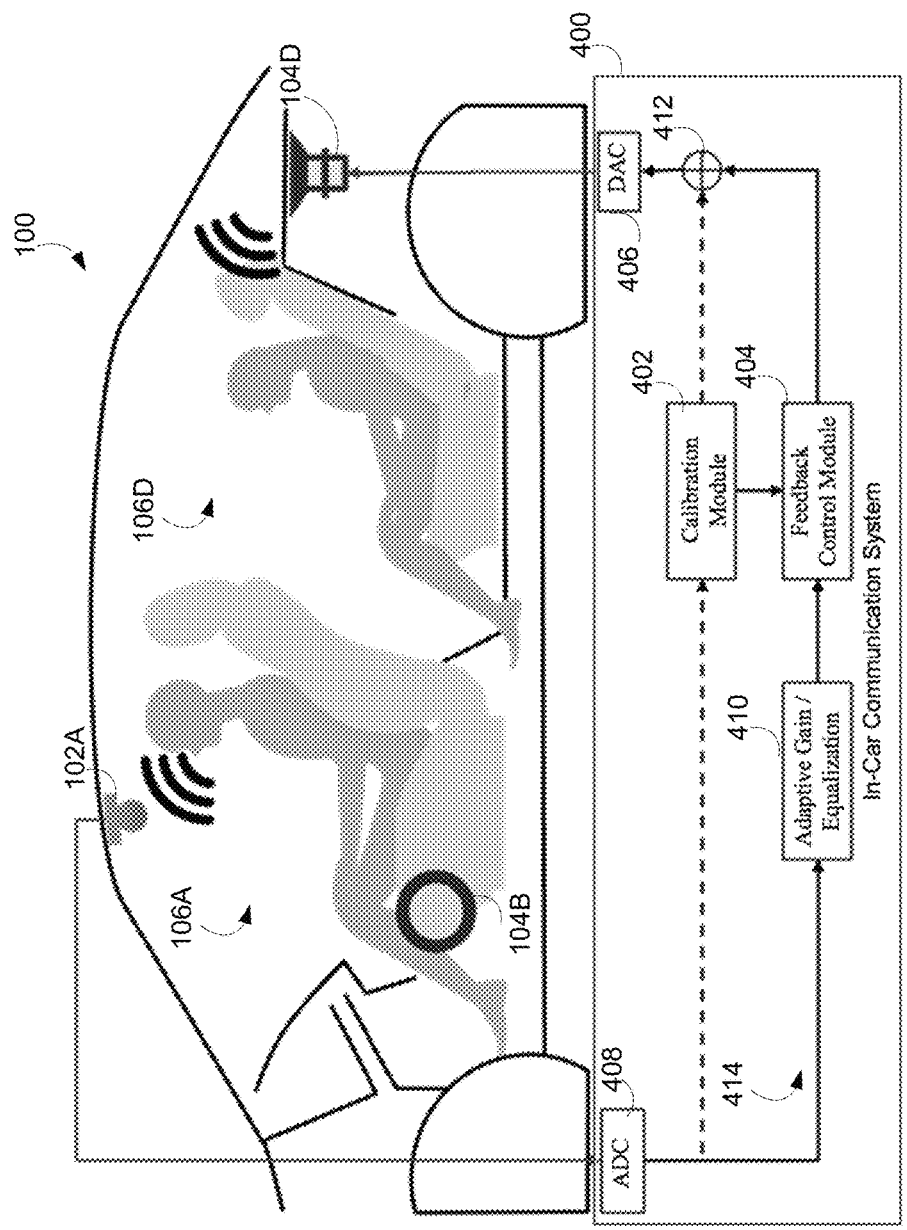
FIG. 4 is a side schematic view of the vehicle of a second speech reinforcement in-car communication system in a zone-to-zone reinforcement that enhances front seat to rear seat communication.
Figure 5:
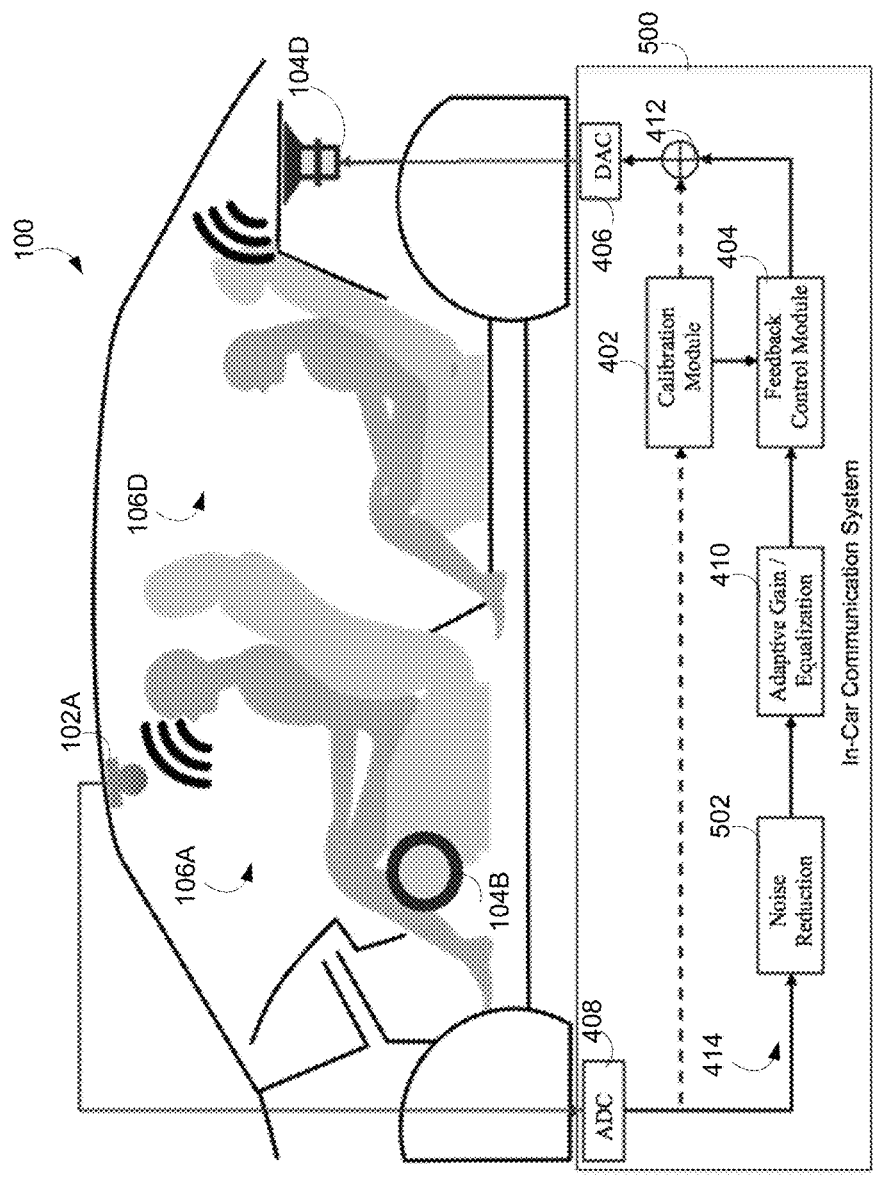
FIG. 5 is a side schematic view of the vehicle of a third speech reinforcement in-car communication system.

FIGS. 4 and 5 are schematics of the system of FIG. 1 operating in a front-to-back and zone-to-zone reinforcement. The systems 400 and 500 of FIGS. 4 and 5 include a front/driver microphone 102 A, a front door loudspeaker 104 A and a rear loudspeaker 104 D. The system shown within vehicle 100 also includes a device that translates digital data into analog signals (a DAC, 406), a device that converts continuously varying analog signals into digital data (an ADC, 408), an adaptive gain/equalization module 410, and a feedback control module 404 in a forward operating path 414. An optional echo reduction module echo reduction (reducing the echo of external signals exclusively such as the infotainment audio/in vehicle signature sounds) and/or noise reduction suppression module 502 is shown in the forward operating path 414 in FIG. 5. The systems of FIGS. 4 and 5 further include a switch, mixer, or matrix mixer 412 and a calibration module 402. The calibration module 402 is used in a calibration process (runs before the system is fully functional, e.g., in pre-production) that measures the transfer functions from each loudspeaker to each microphone.

In FIGS. 4 and 5, the adaptive gain adapts the gain, denoted "g[n]", (e.g., the amplification or attenuation) applied to the microphone signal based on the noise sensed or estimated in the vehicle's cabin or environment. The adaptive gain system measures the noise sensed or estimated in the vehicle's cabin or environment through one or more in cabin sensors and adjusts the gain applied to the microphone signal before the microphone signal is translated into sound. The equalization conditions the microphone signal to restore or modify speech timbre or spectral color by a frequency-dependent equalization, denoted "P[k]". The equalization may compensate (e.g., strengthen or weaken the energy of specific bands of frequency ranges in the aural signal) for signal distortion and delay on the microphone channel so that it remains true to the original speech signal when it reaches the listener's ears via the rendering loudspeaker 104 D. The equalization may include high pass filters, low pass filters, parametric equalizer, or a third octave equalizer. The feedback and control module calculates and applies a time and frequency dependent feedback control factor, F[k,n] described below.

In the ICC system of FIGS. 4 and 5, the closed loop gain depends on a time index designated by the term "n" and the frequency bin index. The ICC system gain G[k,n] 202 is a product of the fixed or adaptive gain, g[n], the static equalization factor, P[k], and a time and frequency dependent feedback control factor, F[k,n], which is measured or estimated by the feedback control module 404. It is represented by EQ. 4.

$$G[k,n]=g[n]*P[k]*F[k,n] \quad (4)$$

Some alternate systems include a noise reduction term nr[k,n], an echo reduction term er[k,n] or other terms multiplied to the product g[n]*P[k]*F[k,n] that may be time and/or frequency dependent (both time and frequency dependence is expressed). The time and frequency dependent feedback control factor F[k,n], is limited by EQ. 5 that is simplified in EQ. 6.

$$g[n]*P[k]*F[k,n]<\text{beta}/H[k] \quad (5)$$

$$F[k,n]<\text{beta}/(g[n]*P[k]*H[k]) \quad (6)$$

To assure stability, the maximal value of F[k,n] is limited by feedback control module 404 in accordance with the stability criterion in EQ. 6. The derivation of F[k,n] may also include temporal and/or frequency dependent smoothing.

While g[n] and P[k] in EQ. 6 are known values applied by the ICC system, H[k], which represents the frequency-dependent coupling of the feedback path, may be unknown, and therefore, may be measured or estimated. In the system of FIGS. 4 and 5, for example, H[k] may be measured or estimated during a calibration process, typically during a tuning phase and either online or offline, by calibration module 402. The calibration module 402 transmits a calibration signal, for example, a controlled sweep signal, a Golay code or a random noise signal, through each loudspeaker 104 and measures or estimates the response at each microphone 102. The calibration module 402 estimates the acoustic coupling between each of the loudspeakers 104 and each of the microphones 102. This prior information (H[k]) is then stored in a memory for online access. It may provide access to the feedback control module 404 or a matrix mixer 412, for example. The upper threshold limit to the time and frequency dependent feedback control factor F[k,n] may therefore be expressed by EQ. 6. Decomposing or normalizing F[k,n] into two parts renders EQ. 7.

$$F[k,n]=f[n]*F'[k,n]. \quad (7)$$

The two parts of F[k,n] can prevent substantial coloration of the reinforcement signal. For example, F'[k, n] may implement a dynamic attenuation of a few select problematic frequencies (e.g., a subset of the aural signal frequencies of the microphone signals), whereas f[n] performs a gain reduction across all aural frequencies of the microphone signals. The dynamic range of F'[k, n] across frequency bins can be limited such that significant spectral coloration of the signal is avoided, whilst f[n] performs an overall gain reduction.

Unlike system that suppress feedback after it occurs, the disclosed system does not rely on feedback/howl detectors to mitigate feedback. By not using feedback/howl detectors, the system need not detect a feedback condition before a listener perceives it or ensure a low rate of false detections (i.e., detecting feedback when none actually exists). To achieve both conditions in a small enclosure, such as a vehicle for example, is impractical because of the strong coupling between the reinforcement loudspeaker (e.g., the loudspeaker rendering the reinforcement signal) to the listener's ear versus the reinforcement loudspeaker to the microphone. This occurs because the reinforcement loudspeaker (e.g., the rear loudspeaker in a front-to-back operating state) is closer to the rear listener's ear than to the front microphone (e.g., near the driver's head). If a detector were used in a small enclosure the rear listener could perceive artifacts of the reinforcement signal, such as an onset of ringing, that would likely be virtually inaudible (e.g., it would be strongly masked by noise) at the front microphone. In other words, if used in a vehicle, once a feedback/howl detector detects feedback in the vehicle, it is often too late to prevent it from being heard.

In some systems, such as the systems shown in FIGS. 1, 2, and 4-8, frequency-dependent gain is applied by the adaptive gain/equalizer independently to each microphone signal prior to the mixing stage. In some systems each of the microphone signals are processed separately through separate adaptive gain/equalization modules 410, separate feedback control modules 404, and separate optional echo reduction modules and/or noise reduction suppression modules

502. The signals are each mixed by the matrix mixer 412, which applies the gain adjustments that are applied to the signals from all microphones to all loudspeaker signal channels. The gains (e.g., via an amplification or an attenuation) that are applied is determined by the time and frequency dependent feedback control factor, F[k,n], which may be constant or vary across all aural frequencies and, in some systems, may be calculated using a compressor, e.g., a compressor with controllable attack and release times.

In FIGS. 4 and 5, calibration module 402 renders and generates a controlled sweep signal or a random noise signal that is transmitted from each loudspeaker (here 104 D) to each microphone (here 102 A) to estimate the acoustic coupling between the loudspeaker(s) 104 and microphone(s) 102. The calibration module 402 measures or estimates the acoustic coupling transfer functions from each loudspeaker to each microphone. Using an empirical tuning factor, beta, and the measured or estimated acoustic coupling transfer functions, the feedback control module 404 determines the maximum forward path frequency-dependent gain that maybe applied to each signal processed by each microphone-loudspeaker pair. When the current forward path frequency-dependent gains exceed the maximum-acceptable forward path frequency-dependent gains, the matrix mixer 412 and/or the feedback and control module 404 selectively attenuate frequency components or sub-bands when the systems are operating in the frequency domain and/or applies a continuous attenuation. The systems of FIGS. 1, 2, and 4-8 operate in the frequency-domain by converting the time domain sampled digital microphone signals into frequency domain signals through a DFT or a DCT. The DFT or DCT renders the frequency domain sub-bands and an inverse DFT or DCT converts the processed frequency bands into a time domain signal once the signals are processed by the forward path 414 and the select and/or continuous frequencies are attenuated.

Figure 6:
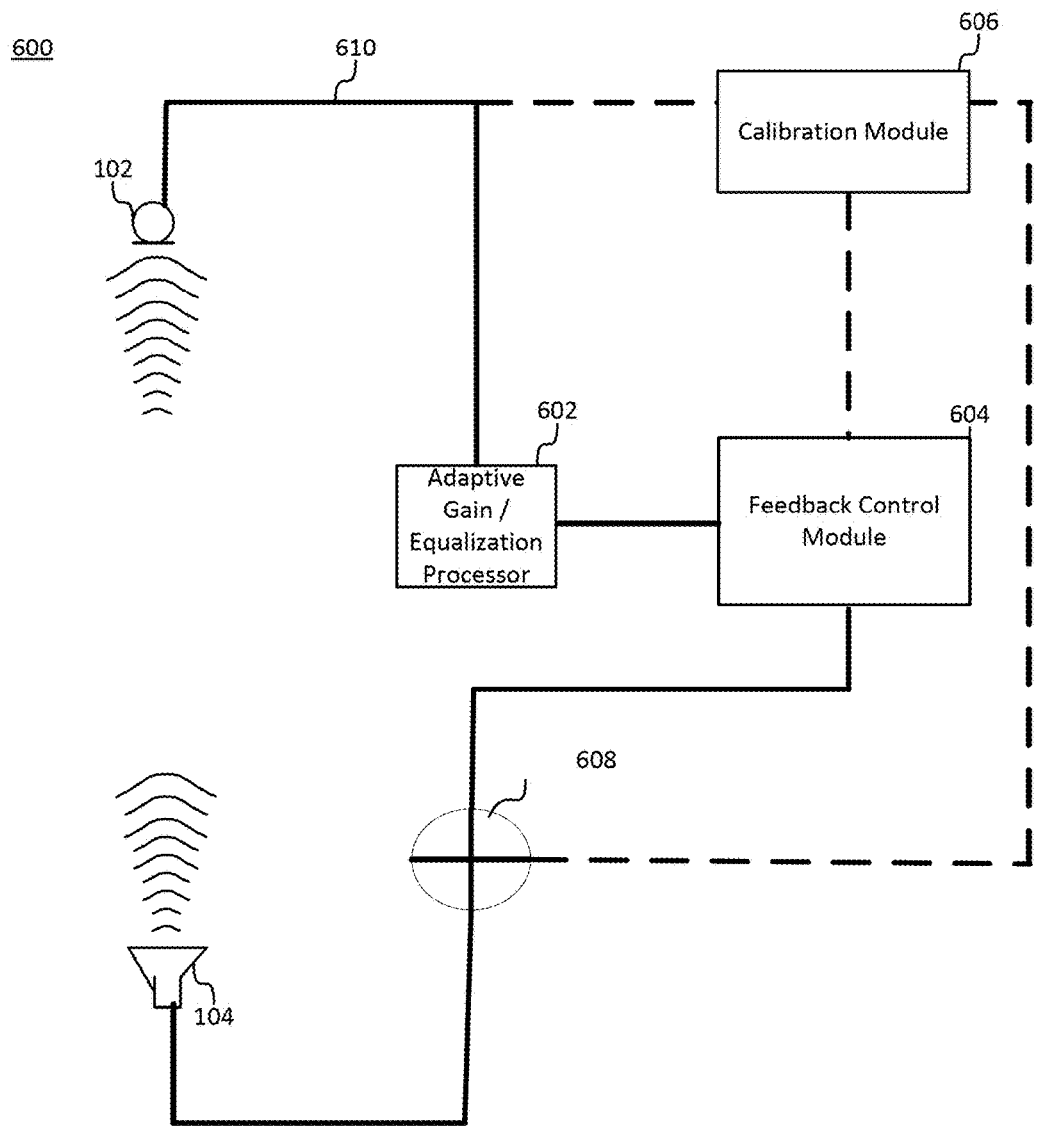
FIG. 6 is a schematic representation of a fourth speech reinforcement system that enhances zone-to-zone communication.

FIG. 6 is a schematic representation of a third speech reinforcement system 600 that enhances zone-to-zone communication in an audio enclosure or a vehicle. The example system includes one or more microphones 102, one or more audio transducers 104, an adaptive gain/equalization processor 602, a feedback control processor 604, a matrix mixer 608, and an optional calibration module processor 606. An alternate system includes an optional echo reduction, noise reduction, and/or suppression processor (not shown) that receives the one or more microphone outputs and sources adaptive gain/equalization processor 602. In other words, the noise reduction and suppression processor is in series between the one or more microphones 102 and the adaptive gain/equalization processor 602.

The one or more microphones 102 may capture the audio signal associated with a driver, co-driver, or another occupant and the infotainment sound and noise, creating one or more captured audio signal 610. The adaptive gain equalization processor 602 adapts the gain (e.g., via an amplification or an attenuation) applied to the captured signal 610 based on the noise sensed or estimated in the vehicle's cabin, environment, or the audio enclosure. It measures the noise sensed or estimated in the vehicle cabin or in car environment or audio enclosure through one or more sensors and adjusts the gain applied to the captured signal 610. The adaptive gain equalization processor 602 also conditions the captured signal 610 to restore or modify the speech timbre or spectral color by an equalization. The adaptive gain equalization processor 602 compensates (e.g., strengthen or weaken the energy of specific bands of frequency ranges in the aural signals) for signal distortion and delay of the captured signal 610 so that it remains true to the original speech signal of the passengers/drivers/users when it reaches the listener's ears via the rendering transducer 104. The adaptive gain equalization processor 602 may render high pass filter functions, low pass filter functions, or parametric equalizer functions, or a third octave equalizer functions.

The feedback control processor 604 calculates and in some system applies the time and frequency dependent feedback control factor, F[k,n] described herein. When the current forward path 414 frequency-dependent gains exceed the maximum acceptable forward path frequency-dependent gains, feedback control processor 604 in some systems and a matrix mixer 608 in other systems attenuates select problematic frequencies, and in some instances, perform a gain reduction across all frequencies of the captured signal 610. The amplified, equalized, and adjusted signal then passes through the matrix mixer 608 that routes the signal to the appropriate transducer 104, which may be one of many served by separate audio channels. When echo reduction and/or noise reduction is used, an optional noise reduction processor, echo reduction processor, and/or suppression processor suppresses signature, environmental, and/or other undesired noise from the captured signal 610. The signature, environmental and/or other noise is attenuated or substantially attenuated before the adaptive gain equalization processor 602 processes the captured signal 610.

In FIG. 6, the calibration processor 606 renders and generates a controlled sweep signal or a random noise signal that is transmitted from each transducer 104 to each microphone 102 to estimate the acoustic coupling between the transducer 104 and microphone 102. The calibration processor 606 measures or estimates the acoustic coupling transfer functions from each transducer 104 to each microphone 102. Using an empirical tuning factor, beta, and the measured or estimated acoustic coupling transfer functions, the feedback control processor 604 determines the maximum forward path 414 frequency-dependent gain that maybe applied to each signal processed by each microphone-loudspeaker pair. In some systems, the maximum forward path frequency-dependent gain is predetermined or determined before the system comes on-line, meaning the calibration processor is only used in pre-production and thus not a required part of the system. Thus, the dashed lines to and from calibration processor 606 shown in FIG. 6 reflect that the calibration processor 606 is not a necessary element of the system.

Figure 7:
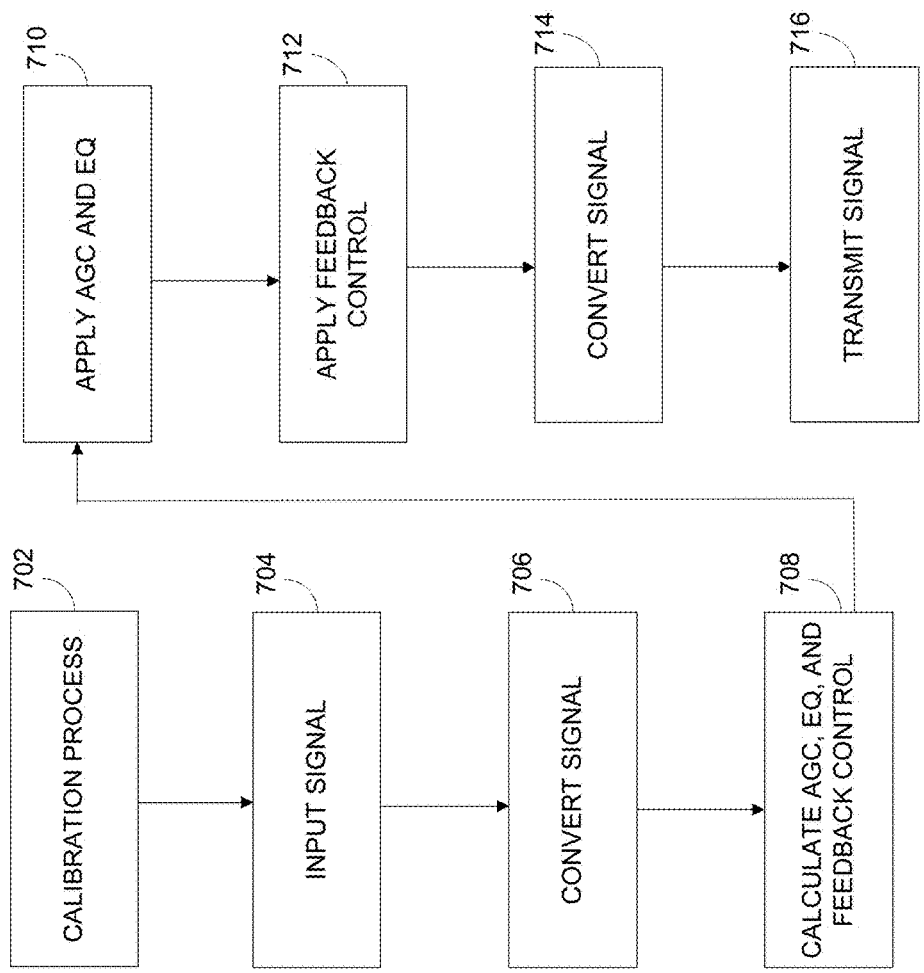
FIG. 7 is a process for reinforcing speech in a vehicle.

FIG. 7 is a process that reinforces speech in a vehicle. The process may be implemented using any of the systems described herein with reference to FIGS. 1, 2, and 4-8. The process reinforces speech by measuring the desired signals x[n] captured by the microphone and converting the speech x[n] to the discrete frequency domain X[k] at 704 and 706. At 708, the process calculates the adaptive gain as a function of frequency to apply to X[k] based on the in-vehicle noise estimates. This results in an equalization. The process also calculates the feedback control factors at 708. The feedback control factors may be calculated from the known adaptive gain value, frequency dependent equalization values, and the measured or estimated transfer functions from each transducer or speaker to each microphone that may be derived by the calibration process 702 described above. The feedback control factor may be pre-calculated and stored in a memory 804. The process applies the adaptive gain to X[k] at 710, the equalization gain values to X[k] at optional 710, and the feedback control factors to X[k] at 712, before synthesizing the gain adjusted X[k] signal into a time domain signal at optional 714 that is transmitted at optional 716 and rendered by a transducer or loudspeaker. In an alternate process, signature and environmental noise is attenuated from X[k] before the adaptive gain, the equalization gain values, and the feedback control factors are applied to X[k].

One or more systems using speech reinforcement may be operated concurrently in alternative system and processes. The primary example described uses the driver as the audio source communicating with one or more passengers positioned behind the driver. In a back-to-front reinforcement process, the driver may also be the listener and the passengers behind the driver may become the audio source. In yet another example, a third row of seats in a vehicle cabin may include a system with speech reinforcement to communicate with all the other vehicle occupants in a front-to-back and back-to-front reinforcement that may run or operate concurrently. In yet another alternative, the system executes one or multiple zone-to-zone reinforcements concurrently where occupied zones are detected by seat sensors or images captured by an in-vehicle camera so that reinforced substantially echo free audio is exchanged from zone-to-zone or seat-to-seat.

Figure 8:
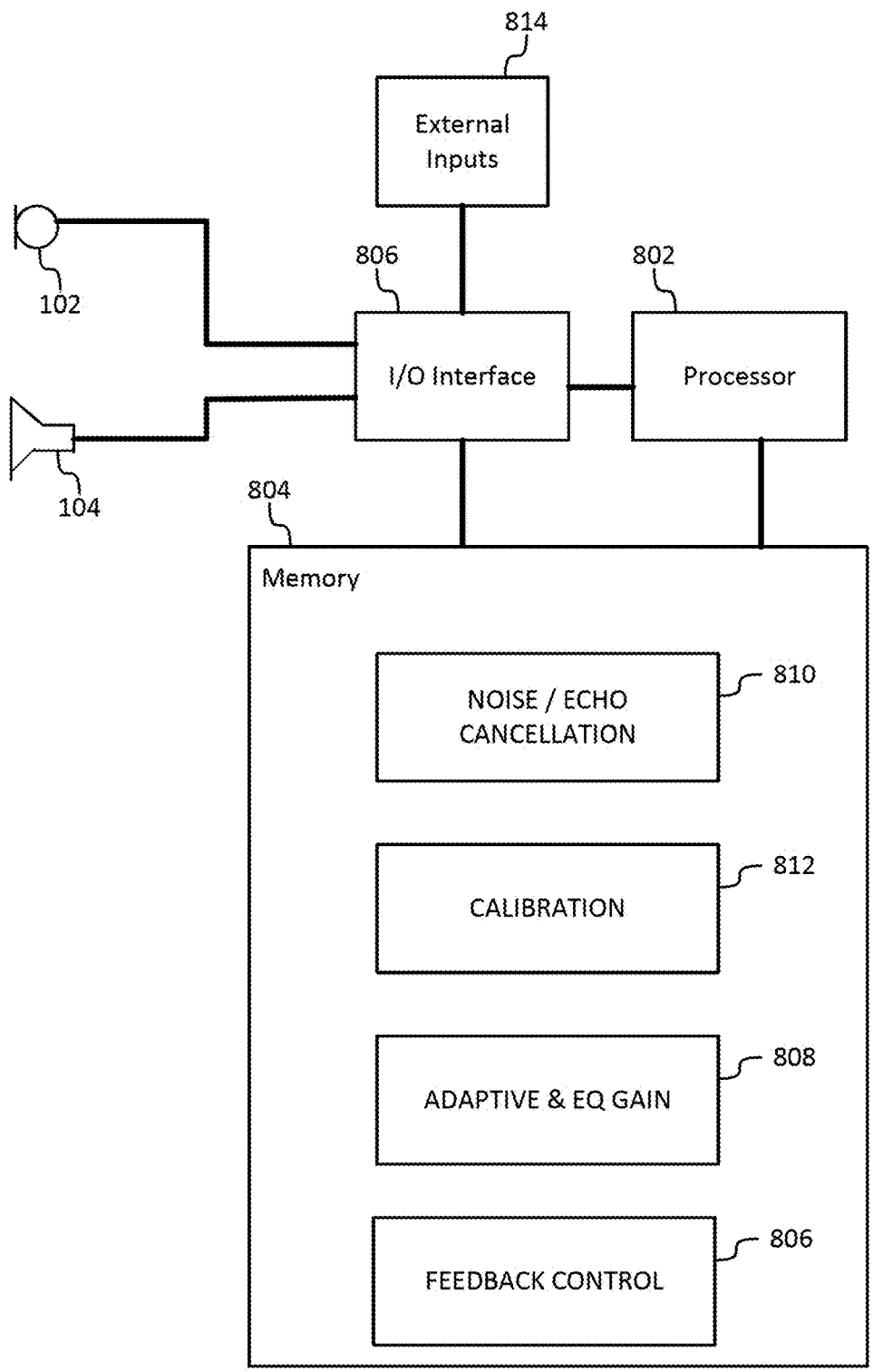
FIG. 8 is a block diagram of a fifth speech reinforcement in-car communication system that enhances zone-to-zone communication.

FIG. 8 is a block diagram of a fourth speech reinforcement in-car communication system that enhances zone-to-zone communication. The system comprises a processor 802, a non-transitory media such as a memory 804 (the contents of which are accessible by the processor 802) and an I/O interface 806. The I/O interface 806 may be used to connect devices such as, for example, additional microphones, audio transducers or loudspeakers, and receive external inputs 814 from other local or remote sources that communicate or interface to the ICC system. The memory 804 may store instructions which when executed by the processor 802 causes the system to render some or all of the functionality associated with the systems described herein. For example, the memory 804 may store instructions which when executed by the processor 802 causes the system to mitigate feedback through the feedback control 806, the adaptive and equalized gain 808, the optional echo and noise reduction 810 and the calibration 812 and/or some or all combinations of the other optional enhancements described above. In addition, data structures, temporary variables and other information may store data in data storage.

The processor 802 may comprise a single processor or multiple processors that may be disposed on a single chip, on multiple devices or distributed over more than one system. The processor 802 may be hardware that executes computer executable instructions or computer code embodied in the memory 804 or in other memory to perform one or more features of the ICC system. The processor 802 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 804 or storage disclosed may retain an ordered listing of executable instructions for implementing the functions described above. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memory 804 may comprise a single device or multiple devices that may be disposed on one or more dedicated memory devices or on a processor or other similar device. When functions or steps are said to be "responsive to" or occur "in response to" a function or a process, the device functions or steps necessarily occur as a result of the function or message. It is not sufficient that a function or act merely follow or occur subsequent to another. Further, when functions indicate an echo cancellation, infotainment audio and other in vehicle sounds that are not passenger or driver voices are removed in the aural range by subtracting an estimate of these signals (e.g., the echo signal) from the received signal; whereas when a functions indicates an echo suppression the amplitude of the echo signal is reduced through an attenuator.

The memory 804 may also store computer code, such as the adaptive gain/equalization processor 602, the feedback control processor 604, the matrix mixer 608, the calibration module processor 606, and the noise reduction and suppression processor. The computer code may include instructions executable with the processor 802. The computer code may be written in any computer language, such as C, C++, assembly language, channel program code, and/or any combination of computer languages. The memory 804 may store information in data structures including, for example, feedback and or echo canceller coefficients that render or estimate echo signal levels.

The functions, acts or tasks illustrated in the figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device for reading by local or remote systems. In other embodiments, the logic or instructions are stored in a remote location for transfer through a computer network or over wireless or tangible telephone or communication lines. In yet other embodiments, the logic or instructions may be stored within a given computer such as, for example, a CPU.

The disclosed system and process reinforces speech naturally without distortion or added noise in a vehicle. A vehicle may comprise, without limitation, a car, bus, truck, tractor, motorcycle, bicycle, tricycle, quadricycle, or other cycle, ship, submarine, boat or other watercraft, helicopter, drone, airplane or other aircraft, train, tram or other railed vehicle, spaceplane or other spacecraft, and any other type of vehicle whether currently existing or after-arising this disclosure. In other words, it comprises a device or structure for transporting persons or things.

The system is fully automated such that the amount of gain is continuously adapted to mitigate feedback and noise level within the vehicle cabin. So as different conditions are experienced, gain is immediately and smoothly adjusted and the driver does not need to operate any controls at all. The system operates at low delay so the talker will only perceive that their voice is slightly louder and not delayed or sounding processed. The low delay operation of the system reinforces speech so that is does not perceptibly interfere with direct, non-reinforced speech. The system reinforces speech and attenuate background noise so that the reinforced, substantially echoless, noise suppressed speech sounds natural despite the processing. The system is unaffected by its simultaneous or concurrent operation, it operates in musical environments and does not cause any perceptible distortion to music or other media. The system can be implemented on or within other in-car systems such as an infotainment processor and digital signal processors or DSPs and co-exist with other system software. The system is easy and quickly adapted to different vehicle and cabin types and different acoustic configurations.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A method that mitigates feedback in an audio system that adjusts audio signals in a vehicle cabin comprising:
generating maximum forward path frequency-dependent gains for each of the plurality of loudspeakers to each of the plurality of microphones;
generating forward path frequency-dependent gains independently that are applied to a plurality of loudspeaker signals, each of the loud speaker signals drive one of the plurality of loudspeakers, respectively; and
adjusting forward path frequency-dependent gains based on the maximum forward path frequency-dependent gains to prevent the actual forward path frequency-dependent gains from exceeding the maximum forward path frequency-dependent gains;
wherein the maximum forward path frequency-dependent gains are inversely related to an estimated or a measured noise within the vehicle cabin, equalization conditions that modify speech within the vehicle cabin, and an echo reduction within the vehicle cabin.

2. The method of claim 1 where the determination of maximum forward path frequency-dependent gains comprises generating transfer function estimates from each of a plurality of loudspeakers to each of a plurality of microphones in the vehicle, and a frequency-dependent tuning factor.

3. The method of claim 1 where the maximum forward path frequency-dependent gains are inversely proportional to a transfer function estimate.

4. The method of claim 1 further comprising generating and applying the adjusted forward path frequency-dependent gains independently to each signal received from the plurality of microphones prior to combining each of the received signals.

5. The method of claim 4 where each signal received from the plurality of microphones comprises a voice signal.

6. The method of claim 1 further comprising applying the adjusted forward path frequency-dependent gains independently to each signal received from the plurality of microphones at a matrix mixer prior to combining each of the received signals.

7. The method of claim 1 where each of the adjustment of the forward path frequency-dependent gains is a constant adjustment applied across all frequencies.

8. The method of claim 1 where the act of generating transfer function estimates from each of a plurality of loudspeakers to each of the plurality of microphones in the vehicle occurs through a calibration process.

9. The method of claim 1 where the act of adjusting forward path frequency-dependent gains comprises attenuating a subset of aural frequency bands and reducing gain across all frequencies of the aural signals that comprise the microphone signals.

10. A non-transitory machine-readable medium encoded with machine-executable instructions, where execution of the machine-executable instructions is for:
generating maximum forward path frequency-dependent gains for each of the plurality of loudspeakers to each of the plurality of microphones;
generating forward path frequency-dependent gains independently that are applied to a plurality of loudspeaker signals, each of the loud speaker signals drive one of the plurality of loudspeakers, respectively; and
adjusting forward path frequency-dependent gains based on the maximum forward path frequency-dependent gains to prevent the actual forward path frequency-dependent gains from exceeding the maximum forward path frequency-dependent gains;
wherein the maximum forward path frequency-dependent gains are inversely related to an estimated or a measured noise within the vehicle cabin, equalization conditions that modify speech within the vehicle cabin, and an echo reduction within the vehicle cabin.

11. The non-transitory machine-readable medium of claim 10 further comprising non-transitory machine-readable medium encoded with machine-executable instructions for generating transfer function estimates from each of a plurality of loudspeakers to each of a plurality of microphones in the vehicle, and a frequency-dependent tuning factor.

12. The non-transitory machine-readable medium of claim 10 where the maximum forward path frequency-dependent gains are inversely proportional to a transfer function estimate.

13. The non-transitory machine-readable medium of claim 10 further comprising non-transitory machine-readable medium encoded with machine-executable instructions for applying the adjusted forward path frequency-dependent gains to the voice signals that are converted into electrical signals by the plurality of microphones.

14. The non-transitory machine-readable medium of claim 10 further comprising non-transitory machine-readable medium encoded with machine-executable instructions for applying the adjusted forward path frequency-dependent gains independently to each signal received from the plurality of microphones prior to combining each of the received signals.

15. The non-transitory machine-readable medium of claim 14 where each signal received from the plurality of microphones comprises a voice signal.

16. The non-transitory machine-readable medium of claim 10 further comprising non-transitory machine-readable medium encoded with machine-executable instructions for applying the adjusted forward path frequency-dependent gains independently to each signal received from the plurality of microphones at a matrix mixer prior to combining each of the received signals.

17. The non-transitory machine-readable medium of claim 10 where each of the adjustment of the forward path frequency-dependent gains comprises a constant adjustment applied across all frequencies.

18. The non-transitory machine-readable medium of claim 10 where the generating transfer function estimates from each of a plurality of loudspeakers to each of the plurality of microphones in the vehicle occurs through a calibration process.

19. The non-transitory machine-readable medium of claim 10 where the adjusting forward path frequency-dependent gains comprises attenuating a subset of aural frequency bands and reducing gain across all frequencies of the aural signals that comprise the microphone signals.

20. A system that mitigates feedback in an audio system that adjust voice signals in a vehicle cabin comprising:
   feedback control means for generating maximum forward path frequency-dependent gains based on transfer function estimates and a frequency-dependent tuning factor for each of the plurality of loudspeakers to each of the plurality of microphones; and
   adaptive gain equalization means for calculating forward path frequency-dependent gains independently that are applied to a plurality of loudspeaker signals, each of the loud speaker signals drive one of the plurality of loudspeaker signals, respectively;
   where the feedback control means adjusts the forward path frequency-dependent gains based on the maximum forward path frequency-dependent gains to prevent the actual forward path frequency-dependent gains from exceeding the maximum forward path frequency-dependent gains
   wherein the maximum forward path frequency-dependent gains are inversely related to an estimated or a measured noise within the vehicle cabin, equalization conditions that modify speech within the vehicle cabin, and an echo reduction within the vehicle cabin.

21. The system of claim 20 further comprising calibration means for generating the transfer function estimates from each of a plurality of loudspeakers to each of a plurality of microphones in the vehicle.

22. The system of claim 20 further comprising a mixer means that combines each signal received from the plurality of microphones.

23. A system that mitigates feedback in an audio system that adjust voice signals in a vehicle cabin comprising:
   a calibration module that generates transfer function estimates from each of a plurality of loudspeakers to each of a plurality of microphones in the vehicle;
   a feedback control module that generates maximum forward path frequency-dependent gains based on the transfer function estimates and a frequency-dependent tuning factor for each of the plurality of loudspeakers to each of the plurality of microphones; and
   an adaptive gain equalization module that generates a forward path frequency-dependent gains independently that are applied to a plurality of loudspeaker signals, each of the loud speaker signals drive one of the plurality of loudspeakers, respectively;
   wherein the feedback control means adjusts the forward path frequency-dependent gains based on the maximum forward path frequency-dependent gains to prevent the actual forward path frequency-dependent gains from exceeding the maximum forward path frequency-dependent gains; and
   wherein the maximum forward path frequency-dependent gains are inversely related to an estimated or a measured noise within the vehicle cabin, equalization conditions that modify speech within the vehicle cabin, and an echo reduction within the vehicle cabin.

24. The system of claim 23 further comprising a matrix mixer that adjusts the forward path frequency-dependent gains independently to each signal received from the plurality of microphones prior to combining each of the received signals.

* * * * *